US011143881B2

(12) United States Patent
Vandroux et al.

(10) Patent No.: US 11,143,881 B2
(45) Date of Patent: Oct. 12, 2021

(54) PROCESS FOR PRODUCING, BY ETCHING THROUGH A LENTICULAR GRATING, IMAGES THAT MAY BE SELECTIVELY VIEWED BY VARYING ANGLE OF OBSERVATION

(71) Applicant: IDEMIA FRANCE, Colombes (FR)

(72) Inventors: Coralie Vandroux, Colombes (FR); Yvonnic Morel, Colombes (FR); Benoit Berthe, Colombes (FR)

(73) Assignee: IDEMIA FRANCE, Colombes (FR)

( * ) Notice: Subject to any disclaimer, the term of this patent is extended or adjusted under 35 U.S.C. 154(b) by 651 days.

(21) Appl. No.: 16/065,999

(22) PCT Filed: Dec. 21, 2016

(86) PCT No.: PCT/FR2016/053612
§ 371 (c)(1),
(2) Date: Dec. 10, 2018

(87) PCT Pub. No.: WO2017/109412
PCT Pub. Date: Jun. 29, 2017

(65) Prior Publication Data
US 2019/0094559 A1 Mar. 28, 2019

(30) Foreign Application Priority Data

Dec. 23, 2015 (FR) ...................................... 1563244

(51) Int. Cl.
*G02B 30/00* (2020.01)
*G02B 30/27* (2020.01)
(Continued)

(52) U.S. Cl.
CPC ............. *G02B 30/27* (2020.01); *B41M 3/148* (2013.01); *B41M 5/24* (2013.01); *B42D 25/324* (2014.10);
(Continued)

(58) Field of Classification Search
CPC ........ G02B 30/00; G02B 30/10; G02B 30/26; G02B 20/27; G02B 3/0043; G02B 3/005;
(Continued)

(56) References Cited

U.S. PATENT DOCUMENTS 6,069,680 A * 5/2000 Kessler .................. G03B 35/00
355/22
6,288,842 B1 * 9/2001 Florczak ................ G02B 5/128
359/619

(Continued)

FOREIGN PATENT DOCUMENTS

EP 1 876 028 A1 1/2008
EP 2 050 574 A1 4/2009
(Continued)

OTHER PUBLICATIONS

Office Action issued in European Patent Application No. 16 829 267.0 dated May 26, 2020 with partial English translation provided.
(Continued)

*Primary Examiner* — Stephone B Allen
*Assistant Examiner* — Jyotsna V Dabbi
(74) *Attorney, Agent, or Firm* — Nixon & Vanderhye

(57) ABSTRACT

A process for producing, under a lenticular grating, in an etching zone, by laser etching, using a tool, a first image and at least one second image that may be selectively viewed by varying angle of observation, the tool including a laser, a galvanometric head and a lens, and defining an optical axis and a working zone, which includes steps of: placing the etching zone in a first location included in the working zone and on the periphery of the working zone, and, perpendicularly to the optical axis, etching the first image; and then placing the etching zone in a second location, which is different from the first location, included in the working
(Continued)

Figure 1:
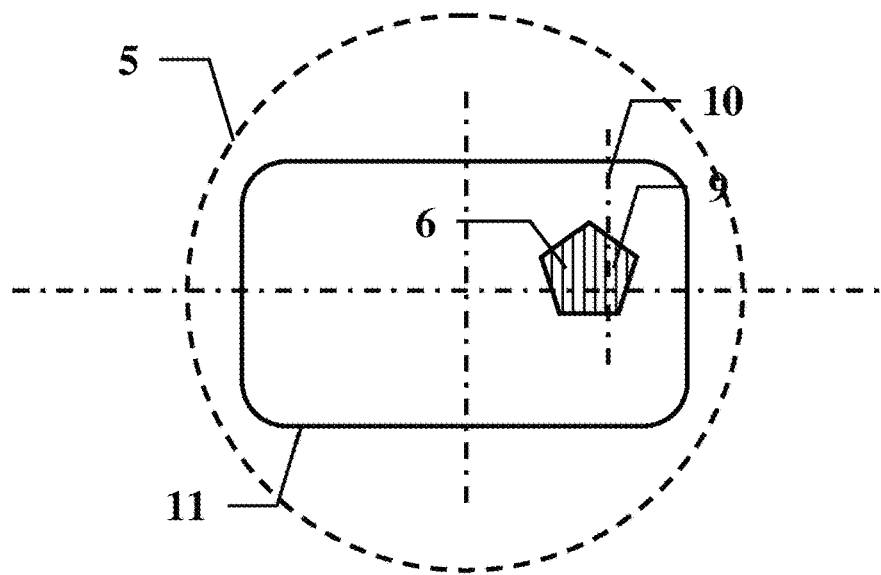

zone and on the periphery of the working zone, and, perpendicularly to the optical axis, etching the second image.

20 Claims, 3 Drawing Sheets

(51) Int. Cl.
| | | |
|---|---|---|
| *B42D 25/41* | (2014.01) | |
| *B41M 5/24* | (2006.01) | |
| *B42D 25/324* | (2014.01) | |
| *B41M 3/14* | (2006.01) | |
| *B44F 1/10* | (2006.01) | |
| *B44C 1/22* | (2006.01) | |
| *G02B 30/10* | (2020.01) | |
| *B41M 5/26* | (2006.01) | |
| *G02B 30/26* | (2020.01) | |

(52) U.S. Cl.
CPC ............. *B42D 25/41* (2014.10); *B44C 1/228* (2013.01); *B44F 1/10* (2013.01); *G02B 30/10* (2020.01); *B41M 5/26* (2013.01); *G02B 30/00* (2020.01); *G02B 30/26* (2020.01)

(58) Field of Classification Search
CPC ...... G02B 27/10; B42D 25/324; B42D 25/41; B42D 25/00; B42D 25/405; B42D 25/43; B42D 25/435; B42D 25/29; B42D 2035/28; B42D 2035/44; B42D 2035/20; B41M 3/148; B41M 3/14; B41M 5/24; B41M 5/26; B41M 5/34; B44F 1/10; B44C 1/228; B44C 1/227; B44C 1/22; B41J 2/442; B41J 2/44; B41J 2/435; B41J 15/14; B41J 27/00; B23K 26/36; B23K 26/57; B23K 26/50; H04N 13/305; G06K 19/06

USPC .................................... 359/463, 462; 348/59
See application file for complete search history.

(56) References Cited

U.S. PATENT DOCUMENTS

| | | |
|---|---|---|
| 8,477,172 B2 | 7/2013 | Hoerl et al. |
| 2010/0103528 A1 | 4/2010 | Endle et al. |

FOREIGN PATENT DOCUMENTS

| | | |
|---|---|---|
| EP | 2580065 A1 | 4/2013 |
| WO | 2011/074956 A1 | 6/2011 |

OTHER PUBLICATIONS

International Search Report, dated Apr. 7, 2017, from corresponding PCT/FR2016/053612 application.

\* cited by examiner

PROCESS FOR PRODUCING, BY ETCHING THROUGH A LENTICULAR GRATING, IMAGES THAT MAY BE SELECTIVELY VIEWED BY VARYING ANGLE OF OBSERVATION

The present invention relates to a method for producing at least two images that can be selectively viewed by varying the angle of observation.

It is known practice to produce such images by interleaving said images and by arranging the resulting interleaving under a lenticular grating. This combination of an interleaving and of a suitable lenticular grating makes it possible to obtain a device in which a first image can be viewed when the device is observed according to a first angle of observation and at least one second image can be viewed when the device is observed according to a second angle of observation, different from the first angle of observation.

According to one family of methods, the interleaving is performed first, typically by printing, to be then placed under the lenticular grating.

According to another family of methods, more particularly suited to customization, a laser-sensitive layer is arranged under the lenticular grating and the images are produced by laser etching through the lenticular grating.

Customization is understood to mean an individualization of the device, in which an image depends on individual data, for example linked to the bearer of the device. This is so, for example, when an image reproduces an identity photo of the bearer. This is made possible by the laser etching operation which allows for production to be delayed in the fabrication method, when the data are available, and adapted to a single device.

Figure 2:
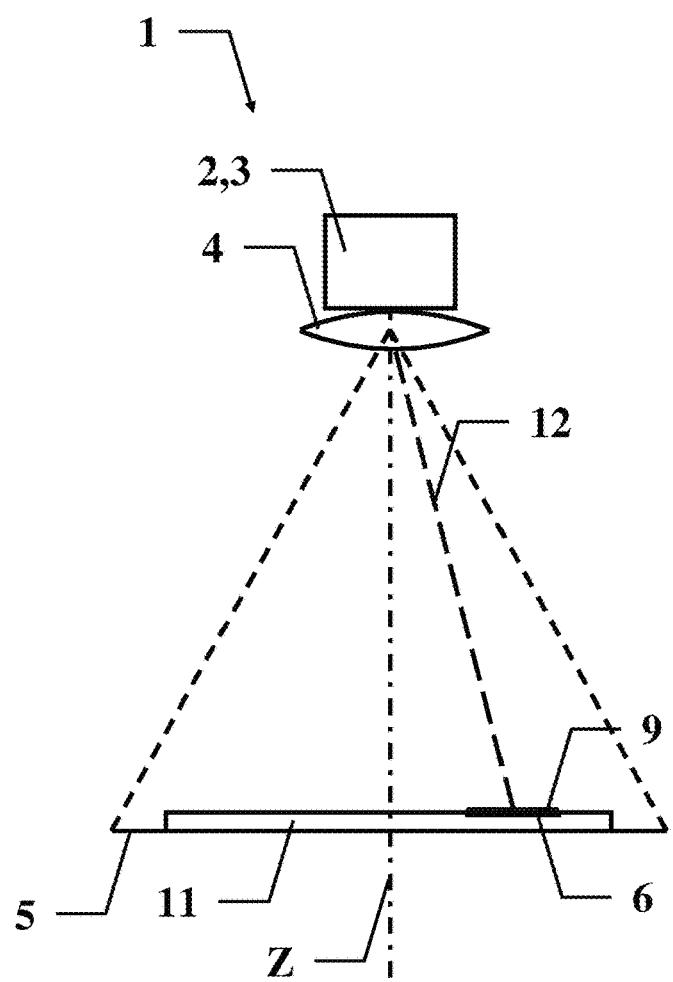

As illustrated in FIGS. 1 and 2, a laser etching is conventionally performed by means of a setup 1 comprising a laser 2, capable of emitting a laser beam 12, a galvanometric head 3 comprising two mirrors that are mobile in order to be able to deflect the laser beam 12 in space in order to scan the surface of the etching zone 6 containing the image to be etched, and a lens 4 cable of focusing the laser beam 12. Such a setup 1, particularly its lens 4, defines an optical axis Z and a working zone 5. The optical axis Z is the central laser firing axis. The working zone 5 is a zone, centered about the optical axis Z, where an etching is possible. Beyond the working zone 5, the optical deformations are too great.

According to the prior art, a device 11 that is to be etched in an etching zone 6, is centered on the optical axis Z.

The etching zone 6 is covered by a lenticular grating 9, through which the laser beam 12 passes.

Through the very principle of lenticular gratings, it is necessary, in order to separate two images to avoid any visual interference, to etch each image according to a mean angle at a distance from the mean angle of another image.

The prior art proposes at least two approaches to address this need.

According to a first approach, for example illustrated by WO 2011074956, the orientation of the device relative to the laser etching setup is modified. This is done by placing the device on a plate that can be tilted about an axis at right angles to the optical axis. One drawback with such an approach is the mechanical complexity of such a tiltable plate. Furthermore, such a plate has to be also translationally mobile along the optical axis in order to correct a defocusing produced by the tilting.

According to another approach, typically illustrated by EP 2050574, an image deflection mirror, adjustable in orientation but fixed during an etching, is used to deflect the laser beam and thus obtain different mean etching angles. One significant drawback is that the adjustment of a deflection mirror depends on the position of the etching zone relative to the device, and thus makes it difficult to change this position. Another drawback is that the distance traveled by the laser beam can be different depending on the location of the image and can lead to variations of the laser density. Furthermore, such an approach does not make it possible to produce a registration through the galvanometric head, which is mandatory in particular when producing a color image.

The present invention remedies these various drawbacks.

The subject of the invention is a method for producing a first image and at least one second image, that can be selectively viewed by varying the angle of observation, under a lenticular grating, in an etching zone, by laser etching, by means of a setup comprising: a laser capable of emitting a laser beam, a galvanometric head capable of deflecting the laser beam and a lens capable of focusing the laser beam, and defining an optical axis and a working zone, comprising the following steps: placing of the etching zone at a first location, included in the working zone, at the periphery of the working zone, and at right angles to the optical axis, etching of the first image, placing of the etching zone at a second location different from the first location, included in the working zone, at the periphery of the working zone, and at right angles to the optical axis, etching of the second image. According to another feature, the etching of an image is produced by means of the laser beam deflected by the galvanometric head so as to scan the etching zone.

According to another feature, the lens is a scanning lens.

According to another feature, the second location is symmetrical to the first location, relative to the optical axis.

According to another feature, the lenticular grating is cylindrical and the second location is symmetrical to the first location, relative to an axis parallel to the axis of the lenticular grating, intersecting the optical axis, and situated in the plane of the lenticular grating.

According to another feature, the first location and the second location are situated in one and the same plane relative to the optical axis.

According to another feature, a location is at a distance from the optical axis so that the mean angle of the laser beam relative to the optical axis is greater than or equal to 15°.

According to another feature, the size of the etching zone is small compared to the size of the working zone, preferentially less than 15% of the size of the working zone.

According to another feature, the etching of a large image is produced by subdividing the image into contiguous parts, each part being assigned to a contiguous etching zone, and by performing, for each part: placing of the etching zone corresponding to said part at the periphery of the working zone and at right angles to the optical axis, etching of said part of the image.

According to another feature, the method is applied to the customization of an identity document.

The invention relates also to a device obtained by such a method.

According to another feature, the lenticular grating or at least one of the etched images occupies a surface greater than 1 cm$^2$, preferentially greater than 3.5×4.5 cm.

According to another feature, a color matrix is arranged under the lenticular grating in order to be able to etch at least one color image.

According to another feature, the first image and said at least one second image are paired so as to produce a 3D effect.

Figure 3:
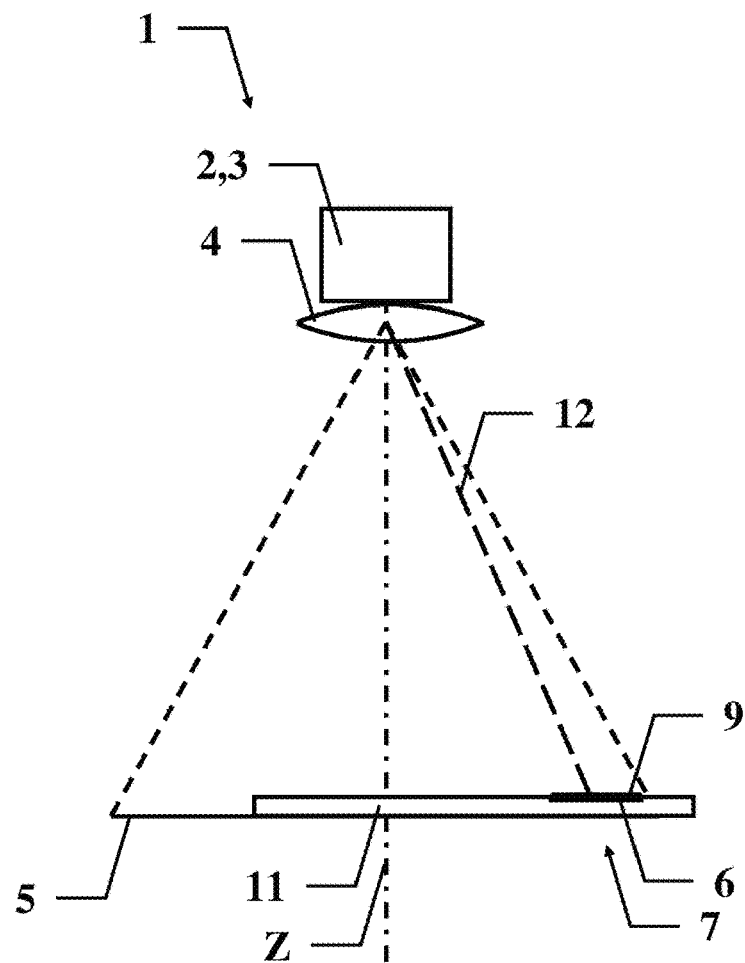
Figure 4:
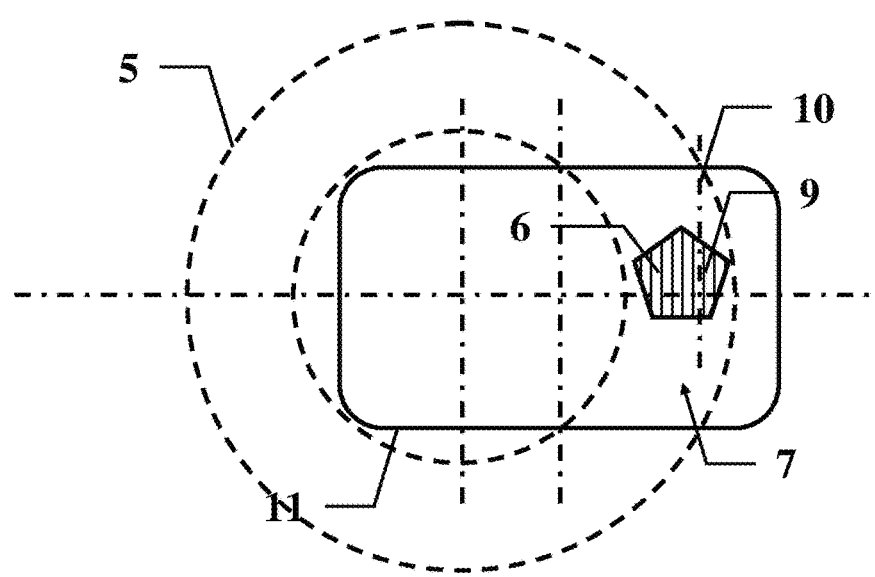
Figure 5:
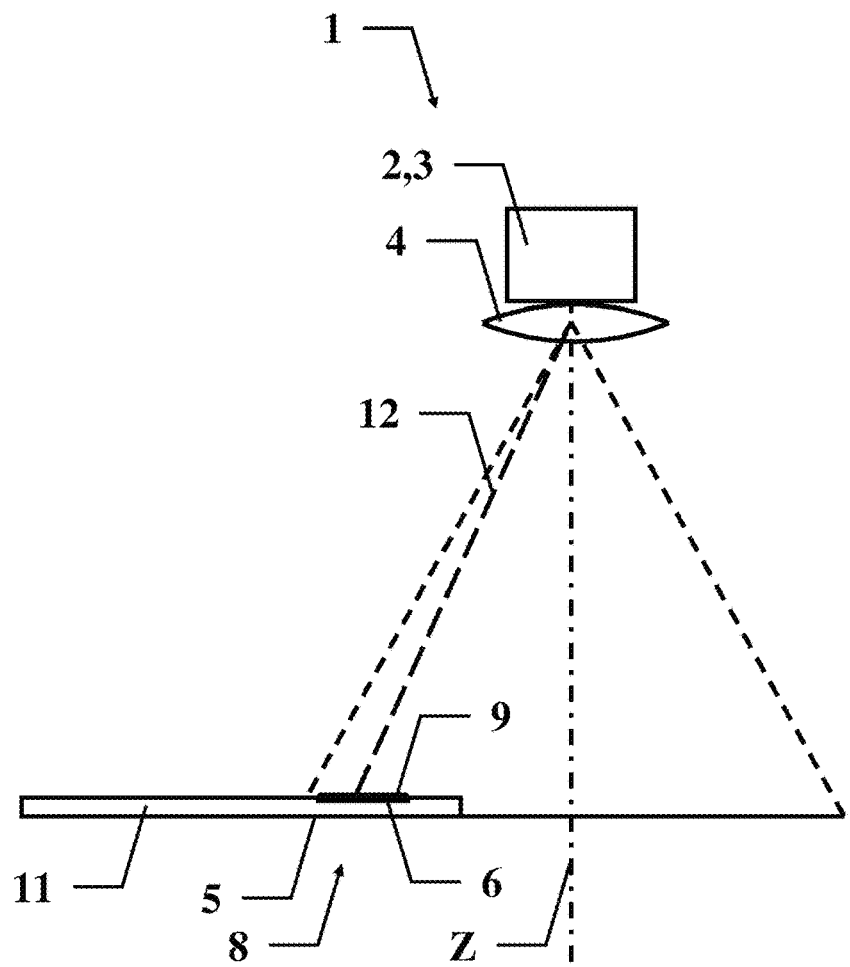
Figure 6:
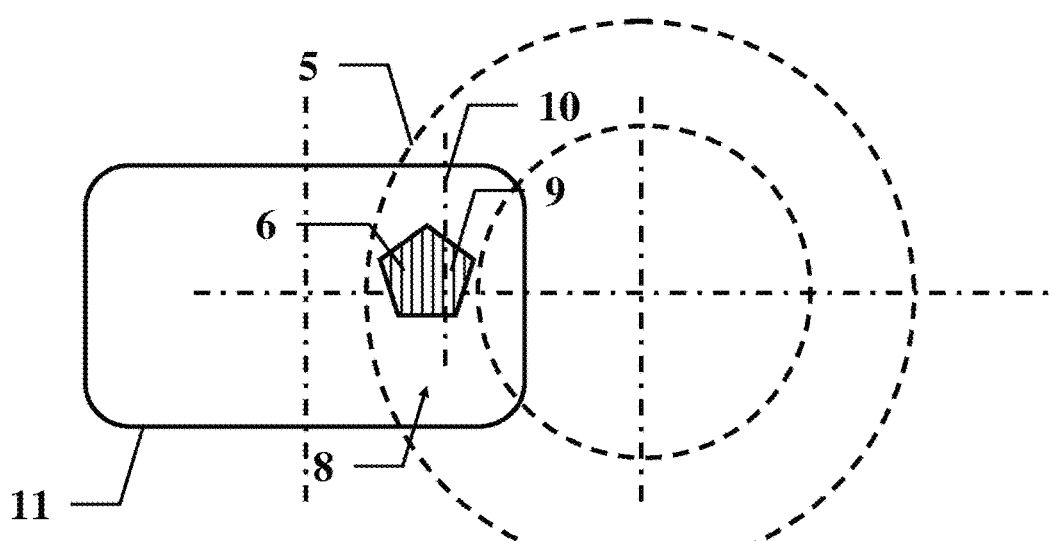

Other features, details and advantages of the invention will become more clearly apparent from the detailed description given hereinbelow by way of indication in relation to the drawings in which:

FIG. 1, already described, presents, in a top view, the device during etching,

FIG. 2, already described, presents, in a side view, the device of FIG. 1,

FIG. 3 presents, in a side view, a device during etching to produce a first image, FIG. 4 presents a plan view corresponding to FIG. 3, FIG. 5 presents, in a side view, the device of FIGS. 3 and 4, during etching to produce a second image, FIG. 6 presents a plan view corresponding to FIG. 5.

The production of an image according to the invention is obtained by laser etching, as previously described with reference to FIGS. 1 and 2. A laser beam 12 fired by a laser 2 is deflected by a galvanometric head 3 in order to scan the surface of an etching zone 6 covering at least all the surface of the image. The deflected laser beam 12 is corrected by passing through a lens 4. The etching zone 6 is covered by a lenticular grating 9. The laser beam 12 passes through the lenticular grating 9 to reach a sensitive layer, present in the etching zone 6, and which darkens in proportion to the received laser power. This selective carbonization makes it possible to create a gray level monochrome image directly or a color image as described in EP 11714352.9 or FR 1103919 indirectly by selective masking of a color matrix.

In the case of multiple images that can be selectively viewed by varying the angle of observation, such etching through the lenticular grating 9 requires very distinct angles from one image to the other.

For that, the basic idea of the invention is to exploit the high angles of incidence resulting from an arrangement of the etching zone 6 at the periphery of the working zone 5.

The method then comprises the following steps. During a first step, more particularly illustrated in FIGS. 3 and 4, the etching zone 6 is placed at a first location 7. This location 7 is necessarily included in the working zone 5, for it to be possible to produce an etching of good quality. It is also arranged substantially at the periphery of the working zone 5, which advantageously makes it possible to obtain an angle of incidence, the angle between the laser beam 12 and the optical axis Z, of the highest order. The device 11 and the etching zone 6 remain at right angles to the optical axis Z, in order to remain within the nominal conditions, of focal length in particular, of use of the setup 1.

After this placing, the first image can be etched, in a conventional way, during a second step.

During a third step, more particularly illustrated in FIGS. 5 and 6, the etching zone 6 is displaced to be placed at a second location 8. This second location 8 is necessarily included in the working zone 5, for it to be possible to perform an etching of good quality. It is also arranged substantially at the periphery of the working zone 5, which advantageously makes it possible to obtain an angle of incidence, of the highest order. The second location 8 is chosen in order for this angle to be remote from the angle of incidence obtained for the first location 7. The device 11 and the etching zone 6 remain at right angles to the optical axis Z, in order to remain within the nominal conditions of use of the setup 1.

After this placing, the second image can be etched, in a conventional manner, during a fourth step.

The function of the lens 4 that is employed is to straighten the distortions caused by the spherical scanning of the galvanometric head 3 followed by a projection onto the plane of the device 11, merged with the plane of the etching zone 6. A lens 4 that is conventionally employed for that is a scanning lens, also called F-theta lens. Such a scanning lens has the property of providing a deflection (in the image plane) proportional to the deflection angle (angle of the beam 12 on entering the lens. This makes it possible to retain a constant point size despite a variation of the deflection angle of the beam 12.

According to one embodiment, the second location 8 is symmetrical to the first location 7, relative to the optical axis Z. Thus, if the first location 7 allows a mean angle of incidence X°, the second location 8 allows an opposite angle −X°.

The lenticular grating 9 can be of any type. Based on the type, the person skilled in the art will adapt the teachings contained herein to the particular type of lenticular grating 9.

In the particular case, corresponding to the great majority of cases of use, in which the lenticular grating 9 is cylindrical, the mean laser firing angle of incidence changes by rotating about the axis 10 of the lenticular grating 9. Also, as illustrated in FIGS. 3-6, the second location 8 is advantageously chosen to be symmetrical to the first location 7, relative to a parallel to the axis 10 of the lenticular grating 9, having an intersection with the optical axis Z, and situated in the working plane or plane of the lenticular grating 9.

According to another feature, the first location 7 and the second location 8 are situated in one and the same plane relative to the optical axis Z. This corresponds to one and the same working plane for which the setup 1 is optimized. The device 11 and the etching zone 6 are in the depth of field of the setup 1. In addition, this feature is advantageous in that it makes it possible to produce a displacement of the device 11 from the first location 7 to the second location 8 by a simple translational movement in its plane. Such a movement can easily be produced by translation of a plate bearing the device 11 or by translation of the device 11 on said plate.

In all cases, and for all the types of lenticular grating 9, the locations 7, 8 must be at the periphery of the working zone 5, i.e. such that the edge of the etching zone 6 is substantially tangential to the edge of the working zone 5. In order to clearly separate the etched images, the locations 7, 8 are at a distance from one another and/or from the optical axis Z, such that the mean angle of the laser beam 12, relative to the optical axis Z, is greater than or equal to 15°.

Each lens 4 conventionally used determines an aperture angle. Thus, a length of 100 mm diameter allows a working zone of 35 mm size/radius and must be used at a lens/device distance of 120 mm. A lens of 163 mm diameter allows a working zone of 60 mm size/radius and must be used at a lens/device distance of 200 mm. The half-aperture angle is thus substantially the same, slightly less than 17°. A mean angle of incidence of 15° is therefore feasible at the periphery of the working zone 5.

Still, in order to separate the images, it is best to keep a central angle in proximity to the optical axis Z unused for the etching of the images. This amounts to not using the central zone of the working zone 5. By avoiding a central cone of 10° half-angle, this amounts to not using a central zone of 30% of the size/diameter of the working zone 5 or of 15% of the half-size/radius.

This later constraint limits the maximum size of the etching zone 6 but makes it possible to benefit from the advantages of the invention: the displacement of the device 11 between the different locations 7, 8 is simple and repeatable.

Furthermore, a viewing system can advantageously see through the assembly of galvanometric head 3 and lens 4, and be used to produce a registration. This is made possible by the fact that registration marks, present on the device 11, are visible, the device 11 being visible in its entirety, and identically in itself from one location 7, 8 to the other, through the galvanometric head 3 and the lens 4.

The constraint described previously of limiting of the maximum size of the etching zone 6 does not however limit the size of an etched image. For a large image, i.e. an image larger than the maximum size for an etching zone 6, it is possible to subdivide the image into contiguous parts, each of a size smaller than the maximum size of an etching zone 6. Each part is assigned to a corresponding etching zone 6. The etching zones 6 are therefore contiguous in the same way that the parts are contiguous. The following is then performed for each part: placing of the etching zone 6 corresponding to said part at the periphery of the working zone 5 and at right angles to the optical axis Z and etching of said part of the image. The fact that the etching zone 6 is arranged at the periphery of the working zone 5 guarantees that the mean angle of incidence of the laser beam 12 is high. A large image can thus be etched, part by part, by repositioning the support and each etching zone between two parts, so as to always retain a high mean angle of incidence of the laser beam 12.

Also, by thus partitioning an image, the constraint of size of the etching zone 6 that can be etched in a single operation, without displacement of the support, does not lead to any limitation of the size of an image. Thus, the size of at least one image, if necessary covered by the lenticular grating 9, is not limited and can occupy a surface greater than 1 cm². It is thus possible to produce, for example, an image of a size greater than 3.5×4.5 cm, thus making it possible to produce an identity photo.

Advantageously, the plurality of etched images comprising the first image and said at least one second image are chosen paired so as to produce a 3D effect. Paired is understood here to mean images of one and the same subject/object seen from different angles, so as to reproduce a relief effect when the images are seen in sequence.

The invention claimed is:

1. A method for producing a first image and at least one second image, that can be selectively viewed by varying an angle of observation, under a lenticular grating (9), in an etching zone (6), by laser etching, by means of a setup (1) that includes a laser (2) capable of emitting a laser beam (12), a galvanometric head (3) capable of deflecting the laser beam (12), and a lens (4) capable of focusing the laser beam (12) and defining an optical axis (Z) and a working zone (5), the method comprising:

placing of the etching zone (6) at a first location (7), included in the working zone (5), in a periphery of the working zone (5), and at right angles to the optical axis (Z), the first location (7) being at a first distance from the optical axis (Z) such that a mean angle of the laser beam (12) relative to the optical axis (Z) is greater than or equal to 15°;

etching of the first image by the laser (2) in the etching zone (6);

placing of the etching zone (6) at a second location (8) different from the first location (7), by a translational movement, by a plate bearing a device (11) during etching, from the first location (7) in a same plane, the second location (8) being inside the working zone (5), in the periphery of the working zone (5), and at right angles to the optical axis (Z), and the second location (8) being at a second distance from the optical axis (Z) such that the mean angle of the laser beam (12) relative to the optical axis (Z) is greater than or equal to 15°; and etching of the second image by the laser (2) in the etching zone (6).

2. The method as claimed in claim 1, wherein the etching of an image is produced by means of the laser beam (12) deflected by the galvanometric head (3) so as to scan the etching zone (6).

3. The method as claimed in claim 2, wherein the lens (4) is a scanning lens.

4. The method as claimed in claim 2, wherein the second location (8) is symmetrical to the first location (7), relative to the optical axis (Z).

5. The method as claimed in claim 2,
wherein the lenticular grating (9) is cylindrical, and
wherein the second location (8) is symmetrical to the first location (7), relative to an axis parallel to an axis (10) of the lenticular grating (9), intersecting the optical axis (Z) and situated in a plane of the lenticular grating (9).

6. The method as claimed in claim 1, wherein the lens (4) is a scanning lens.

7. The method as claimed in claim 6, wherein the second location (8) is symmetrical to the first location (7), relative to the optical axis (Z).

8. The method as claimed in claim 6,
wherein the lenticular grating (9) is cylindrical, and
wherein the second location (8) is symmetrical to the first location (7), relative to an axis parallel to an axis (10) of the lenticular grating (9), intersecting the optical axis (Z) and situated in a plane of the lenticular grating (9).

9. The method as claimed in claim 1, wherein the second location (8) is symmetrical to the first location (7), relative to the optical axis (Z).

10. The method as claimed in claim 9,
wherein the lenticular grating (9) is cylindrical, and
wherein the second location (8) is symmetrical to the first location (7), relative to an axis parallel to an axis (10) of the lenticular grating (9), intersecting the optical axis (Z) and situated in a plane of the lenticular grating (9).

11. The method as claimed in claim 1,
wherein the lenticular grating (9) is cylindrical, and
wherein the second location (8) is symmetrical to the first location (7), relative to an axis parallel to an axis (10) of the lenticular grating (9), intersecting the optical axis (Z) and situated in a plane of the lenticular grating (9).

12. The method as claimed in claim 1, wherein the first location (7) and the second location (8) are situated in one and the same plane relative to the optical axis (Z).

13. The method as claimed in claim 1, wherein a size of the etching zone (6) is less than 15% of a size of the working zone (5).

14. The method as claimed in claim 1, wherein the etching of a large image is produced by subdividing the image into contiguous parts, each part being assigned to a contiguous etching zone (6), and by performing, for each part:

placing of the etching zone (6) corresponding to said part at the periphery of the working zone (5) and at right angles to the optical axis (Z), etching of said part of the image.

15. The method as claimed in claim 1, applied to a customization of an identity document.

16. A device obtained by the method as claimed in claim 1.

17. The device as claimed in claim 16, wherein the lenticular grating (9) or at least one of the etched images occupies a surface greater than 1 cm$^2$.

18. The device as claimed in claim 16, wherein a color matrix is arranged under the lenticular grating (9) in order to be able to etch at least one color image.

19. The device as claimed in claim 16, wherein the first image and said at least one second image are paired so as to produce a 3D effect.

20. The method as claimed in claim 1, further comprising:
performing a registration by means of a viewing system and registration marks present on the device that are visible to the viewing system through an assembly of the galvanometric head (3) and the lens (4), the device (11) being visible in its entirety from the first location (7) to the second location (8), through the galvanometric head (3) and the lens (4).

* * * * *